US010830983B2

United States Patent
Bang et al.

(10) Patent No.: US 10,830,983 B2
(45) Date of Patent: Nov. 10, 2020

(54) CAMERA MODULE ACTUATOR

(71) Applicant: SAMSUNG ELECTRO-MECHANICS CO., LTD., Suwon-si (KR)

(72) Inventors: Je Hyun Bang, Suwon-si (KR); Hoon Heo, Suwon-si (KR); Shin Young Cheong, Suwon-si (KR); Byung Gi An, Suwon-si (KR); Dae Hyun Jeong, Suwon-si (KR)

(73) Assignee: Samusng Electro-Mechanics Co., Ltd., Suwon-si (KR)

( * ) Notice: Subject to any disclaimer, the term of this patent is extended or adjusted under 35 U.S.C. 154(b) by 787 days.

(21) Appl. No.: 15/447,983

(22) Filed: Mar. 2, 2017

(65) Prior Publication Data

US 2018/0067277 A1 Mar. 8, 2018

(30) Foreign Application Priority Data

Sep. 8, 2016 (KR) .................. 10-2016-0115642

(51) Int. Cl.
*G02B 7/09* (2006.01)
*H02K 41/035* (2006.01)
(Continued)

(52) U.S. Cl.
CPC .............. *G02B 7/09* (2013.01); *H02K 11/21* (2016.01); *H02K 11/33* (2016.01);
(Continued)

(58) Field of Classification Search
CPC ... G02B 7/08; G02B 7/09; G02B 7/04; G02B 7/102; G02B 27/646; G02B 7/026; G02B 7/10; G02B 27/0006; G02B 7/02; G02B 13/001; G02B 7/023; G02B 7/028; G02B 15/14; G02B 3/0006; G02B 7/021; G02B 7/022; G02B 7/025; G02B 7/14;
(Continued)

(56) References Cited

U.S. PATENT DOCUMENTS

2005/0168584 A1   8/2005  Uenaka
2013/0321937 A1  12/2013  Baik et al.
(Continued)

FOREIGN PATENT DOCUMENTS

CN    103998275 A    8/2014
CN    105824168 A    8/2016
(Continued)

OTHER PUBLICATIONS

Korean Office Action dated Oct. 19, 2017 in corresponding Korean Patent Application No. 10-2016-0115642 (7 pages in English and 6 pages in Korean).
(Continued)

*Primary Examiner* — William R Alexander
*Assistant Examiner* — Sharrief I Broome
(74) *Attorney, Agent, or Firm* — NSIP Law

(57) ABSTRACT

A camera module actuator is described including a magnet, a coil disposed to face the magnet, and a driver configured to apply a driving signal to the coil to move the magnet. The camera module actuator also includes a detector configured to detect a position of the magnet from a change in inductance of the coil, based on the movement of the magnet.

29 Claims, 5 Drawing Sheets

(51) Int. Cl.
*H02K 11/21* (2016.01)
*H02K 11/33* (2016.01)
*H02P 25/034* (2016.01)
*G02B 7/08* (2006.01)
*G02B 27/64* (2006.01)

(52) U.S. Cl.
CPC ..... *H02K 41/0354* (2013.01); *H02K 41/0356* (2013.01); *H02P 25/034* (2016.02); *G02B 7/08* (2013.01); *G02B 27/646* (2013.01)

(58) Field of Classification Search
CPC . G02B 7/28; G02B 7/282; G03B 3/10; G03B 2205/0069; G03B 13/36; G03B 5/00; G03B 2205/0046; G03B 2205/0053; G03B 13/34; G03B 2205/0015; G03B 2205/0061; G03B 13/32; G03B 17/12; G03B 17/14; G03B 2205/0007; G03B 17/02; G03B 17/04; G03B 17/17; G03B 17/56; G03B 2205/0092; G03B 2217/18; G03B 3/00; H04N 5/2254; H04N 5/2257; H04N 5/2252; H04N 5/2253; H04N 5/23212; H04N 5/2171; H04N 5/2251; H04N 5/2258; H04N 5/23209; H04N 5/23296; H04N 5/247; H04N 5/225; H04N 5/232; H04N 5/23229; H04N 5/23238; H04N 5/23241; H04N 5/23287; H04N 5/2624; H04N 5/44; H04N 7/18; H02K 41/0356; H02K 41/0354; H02K 33/18; H02K 41/035; H02K 33/02; H02K 2201/18; H02K 41/03; H02K 11/01; H02K 11/21; H02K 11/215; H02K 16/00; H02K 2203/12; H02K 2205/00; H02K 23/00; H02K 33/00; H02K 33/16; H02K 35/00; H02K 35/04; H02K 37/00; H02K 37/12; H02N 2/001; H02N 2/026; H02N 2/106; H02N 2/163; H02N 2/0015; H02N 2/0055; H02N 2/103; H02N 2/12; H02N 2/02; H02N 2/043; H02N 1/006; H02N 2/00; H02N 2/004; H02N 2/006; H02N 2/0085; H02N 2/101; H01L 41/083; H01L 41/0973; H01L 41/43; H01L 41/0471; H01L 41/1871; H01L 41/18; H01L 41/0477; H01L 41/1873; H01L 41/273; H01L 21/32136; H01L 21/32139; H01L 41/00; H01L 41/04; H01L 41/042; H01L 41/047; H01L 41/0536; H01L 41/09; H01L 41/094; H01L 41/187; H01L 41/257; C04B 2235/3215; C04B 2235/3236; C04B 2235/786; C04B 2235/768; C04B 2235/3248; C04B 2235/3267; C04B 2235/3281; C04B 2235/77; C04B 2235/3201; C04B 2235/3232; C04B 2235/3255; C04B 2235/5445; C04B 2235/72; C04B 35/4682; C04B 35/49; C04B 35/495; C04B 2235/3206; C04B 2235/3208; C04B 2235/3293; C04B 2235/3418
See application file for complete search history.

(56) References Cited

U.S. PATENT DOCUMENTS

| 2014/0327965 | A1* | 11/2014 | Chen | G02B 7/08 |
| | | | | 359/557 |
| 2014/0347075 | A1 | 11/2014 | Goto et al. | |
| 2016/0139425 | A1* | 5/2016 | Park | H01F 27/325 |
| | | | | 359/557 |
| 2016/0216529 | A1* | 7/2016 | Park | H04N 5/23287 |
| 2016/0274375 | A1* | 9/2016 | Park | G02B 7/02 |
| 2018/0067277 | A1 | 3/2018 | Bang et al. | |

FOREIGN PATENT DOCUMENTS

| CN | 206946169 U | 1/2018 |
| JP | 2009-271204 A | 11/2009 |
| JP | 4817976 B2 | 11/2011 |
| JP | 2016-003894 A | 1/2014 |
| KR | 10-1166418 B1 | 7/2012 |
| KR | 10-2013-0077216 A | 7/2013 |
| KR | 10-1332043 B1 | 11/2013 |
| KR | 10-2014-0088308 A | 7/2014 |

OTHER PUBLICATIONS

Chinese Office Action dated Dec. 2, 2019 in counterpart Chinese Patent Application No. 201710362004.8 (23 pages in English and 15 pages in Chinese).

\* cited by examiner

CAMERA MODULE ACTUATOR

CROSS-REFERENCE TO RELATED APPLICATION(S)

This application claims benefit of priority to Korean Patent Application No. 10-2016-0115642, filed on Sep. 8, 2016, in the Korean Intellectual Property Office, the disclosure of which is incorporated herein by reference in its entirety.

BACKGROUND

1. Field

The following description relates to a camera module actuator.

2. Description of Related Art

Recently, portable communications terminals, such as cellular phones, personal digital assistants (PDA), portable personal computers (PC), or a tablet, generally include the capability to transmit video data, as well as text and audio data. In accordance with this trend, camera modules have commonly been installed in portable communications terminals in order to capture video data and enable video chatting, or other types of video communications.

Generally, a camera module includes a lens barrel having lenses disposed therein, a housing accommodating the lens barrel therein, and an image sensor converting light representing a subject into an electrical signal. A single focus type camera module may be used as the camera module to image a subject or an object with a fixed focus. However, a camera module including an actuator enabling auto-focusing is desired. In addition, the camera module is desired to include an actuator for optical image stabilization (OSS) to reduce a resolution decrease phenomenon due to user hand-shake.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, a camera module actuator is described that precisely detects a position of a magnet without using a hall sensor.

According to an aspect of the present disclosure, a camera module actuator detects a position of a magnet from changes in a resonant frequency, depending on movement of the magnet.

In accordance with an embodiment, there is provided a camera module actuator, including: a magnet; a coil disposed to face the magnet; a driver configured to apply a driving signal to the coil to move the magnet; and a detector configured to detect a position of the magnet from a change in inductance of the coil based on the movement of the magnet.

The inductance of the coil may vary based on a strength of a magnetic field of the magnet.

The detector may include a resonant frequency detecting circuit including a capacitor, which forms a resonant tank together with the coil, and a resonant frequency of the resonant tank may be determined based on the inductance of the coil.

The resonant frequency detecting circuit may further include a detection signal generator configured to apply a detection signal to the resonant tank.

The detection signal may include a sinusoidal wave of which a frequency may be varied in a predetermined range.

The detector may further include a resonant frequency calculator configured to calculate the resonant frequency of the resonant tank.

The resonant frequency calculator may be further configured to calculate the resonant frequency using a gain value corresponding to a ratio of an output voltage of the resonant tank to a voltage of the detection signal.

The resonant frequency calculator may be further configured to determine a frequency at which the gain value may be maximal as the resonant frequency.

The detector may further include a position determiner configured to determine the position of the magnet based on the resonant frequency.

The position determiner may include position information of the magnet corresponding to the resonant frequency.

A magnetic body may be disposed between the magnet and the detector.

In accordance with an embodiment, there is provided a camera module actuator, including: a magnet; a coil disposed to face the magnet; a driver configured to apply a driving signal to the coil to move the magnet in one direction; and a detector comprising a capacitor forming a resonant tank with the coil and configured to detect a position of the magnet from a change in a resonant point of the resonant tank based on the movement of the magnet.

The detector may be further configured to detect the position of the magnet from a resonant frequency in the resonant point.

The resonant frequency may vary depending on a change of coil inductance, depending on a strength of a magnetic field of the magnet.

The detector may be further configured to apply a detection signal to the resonant tank, wherein the detection signal may include a sinusoidal wave of which a frequency may vary within a predetermined range.

The detector may be further configured to calculate the resonant frequency using a gain value corresponding to a ratio of an output voltage of the resonant tank to a voltage of the detection signal.

In accordance with another embodiment, there is provided a camera module actuator, including: a magnet; a coil disposed opposite to the magnet to drive a lens barrel; a detector comprising a capacitor forming a resonant tank with the coil, and configured to calculate a resonant frequency using a gain value corresponding to a ratio of an output voltage of the resonant tank to an input voltage of a detection signal; and a driver configured to provide a driving force to the magnet based on an input signal received and the feedback signal.

The detector calculates a frequency at which the gain value may be maximal as the resonant frequency.

The detection signal may include a sinusoidal wave of which a frequency may be varied at a predetermined range.

The resonant frequency may vary based on a change of coil inductance, based on a strength of a magnetic field of the magnet.

To calculate the resonant frequency, the driver may generate a reference clock signal within a duty cycle of the resonant tank.

A pulse count value of the reference clock may change according to a movement of the lens barrel.

The coil may be located within a range of a magnetic field of the magnet and a conductor and a magnetic material are provided around a lens within the lens barrel.

In accordance with a further embodiment, there is provided a camera module, including: a lens barrel; a housing configured to accommodate the lens barrel; and an actuator configured to move the lens barrel in an optical axis direction, wherein the actuator may include a magnet, a coil, a driver configured to apply a driving signal to the coil to produce a driving force to the magnet and drive the lens barrel, and a detector comprising a resonant frequency detecting circuit configured to generate and provide a detection signal to a resonant tank comprising the coil electrically connected to a capacitor, a resonant frequency calculator configured to calculate a resonant frequency using a gain value corresponding to a ratio of an output voltage of the resonant tank to a voltage of the detection signal, and a position determiner configured to determine a position of the magnet based on the resonant frequency to produce a feedback signal and the driver produces the driving signal based on the feedback signal.

A magnetic body may be disposed between the magnet and the resonant frequency detecting circuit and may be formed of a magnetic material having a high magnetic permeability to enhance an influence of the inductance of the coil and changes depending on the position of the magnet.

The driver and the detector are disposed outside of the coil or in a hollow portion of the coil, inside of the coil.

The resonant frequency calculator determines a frequency at which the gain value may be maximal as the resonant frequency.

The camera module may also include a magnetic body formed of a magnetic material having a high magnetic permeability is formed between the magnet and the resonant frequency detecting circuit.

The capacitor may be positioned inside the actuator or on a printed circuit board outside the actuator.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which.

Figure 1:
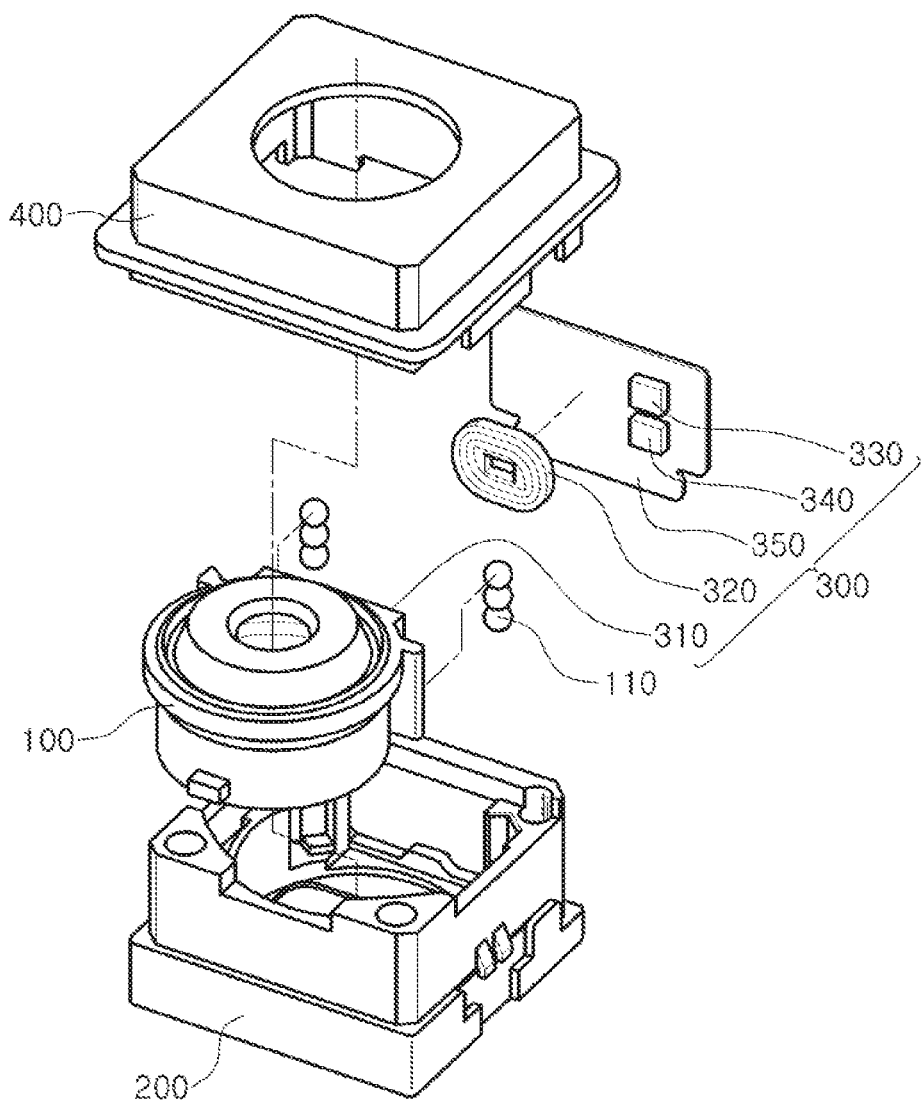
FIG. 1 is an exploded perspective view of a camera module, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the Detailed Description, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower", may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing various embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, various embodiments will be described with reference to schematic views. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also be formed by one or a combination thereof.

FIG. 1 is an exploded perspective view of a camera module, according to an embodiment.

Referring to FIG. 1, the camera module, according to an embodiment, includes a lens barrel 100, a housing 200, an actuator 300, and a case 400.

The lens barrel 100 has a hollow cylindrical shape so that at least one lens imaging a subject or object is accommodated therein, and the lens is provided in the lens barrel 100 along an optical axis. In an example, an optical axis direction refers to a vertical direction in relation to the lens barrel 100. An optical axis is an imaginary line that defines the path along which light propagates through the system, up to first approximation. The optical axis passes through a center of curvature of each surface of the lens, and coincides with an axis of rotational symmetry.

The lens barrel 100 is disposed in or within the housing 200 and is also coupled to the housing 200. The lens barrel 100 moves in one direction, such as the optical axis direction within the housing 200 for the purpose of auto-focusing an image of the subject being captured.

The housing 200 accommodates the lens barrel 100 therein so that the lens barrel 100 moves in the optical axis direction. Therefore, the housing 200 has an internal space formed therein so as to receive and accommodate the lens barrel 100 therein. At least one ball bearing 110 may be provided in the optical axis direction within the lens barrel 100, as a guide unit guiding movement of the lens barrel 100 when the lens barrel 100 moves in the optical axis direction within the housing 200. Although FIG. 1 illustrates three ball bearings 110 to move the lens barrel 110 in the optical axis direction, a single ball bearing 110 may be implemented or more than three ball bearings 110 may be implemented, on each guide portion of the lens barrel.

At least one ball bearing 110 is disposed between the lens barrel 100 and the housing 200, and guides the movement of the lens barrel 100 in the optical axis direction through a rolling motion. At least one ball bearing 110 contacts an outer surface of the lens barrel 100 and an inner surface of the housing 200 in order to guide the movement of the lens barrel 100 in the optical axis direction.

When the lens barrel 100 moves in the optical axis direction within the housing 200, at least one ball bearing 110 supports the lens barrel 100, and the lens barrel 100 thus moves parallel to the optical axis.

The case 400 is coupled to the housing 200 to cover the lens barrel 100, the ball bearing 110, and at least a portion of the housing 200 and form an appearance of the camera module, according to an embodiment.

Figure 2:
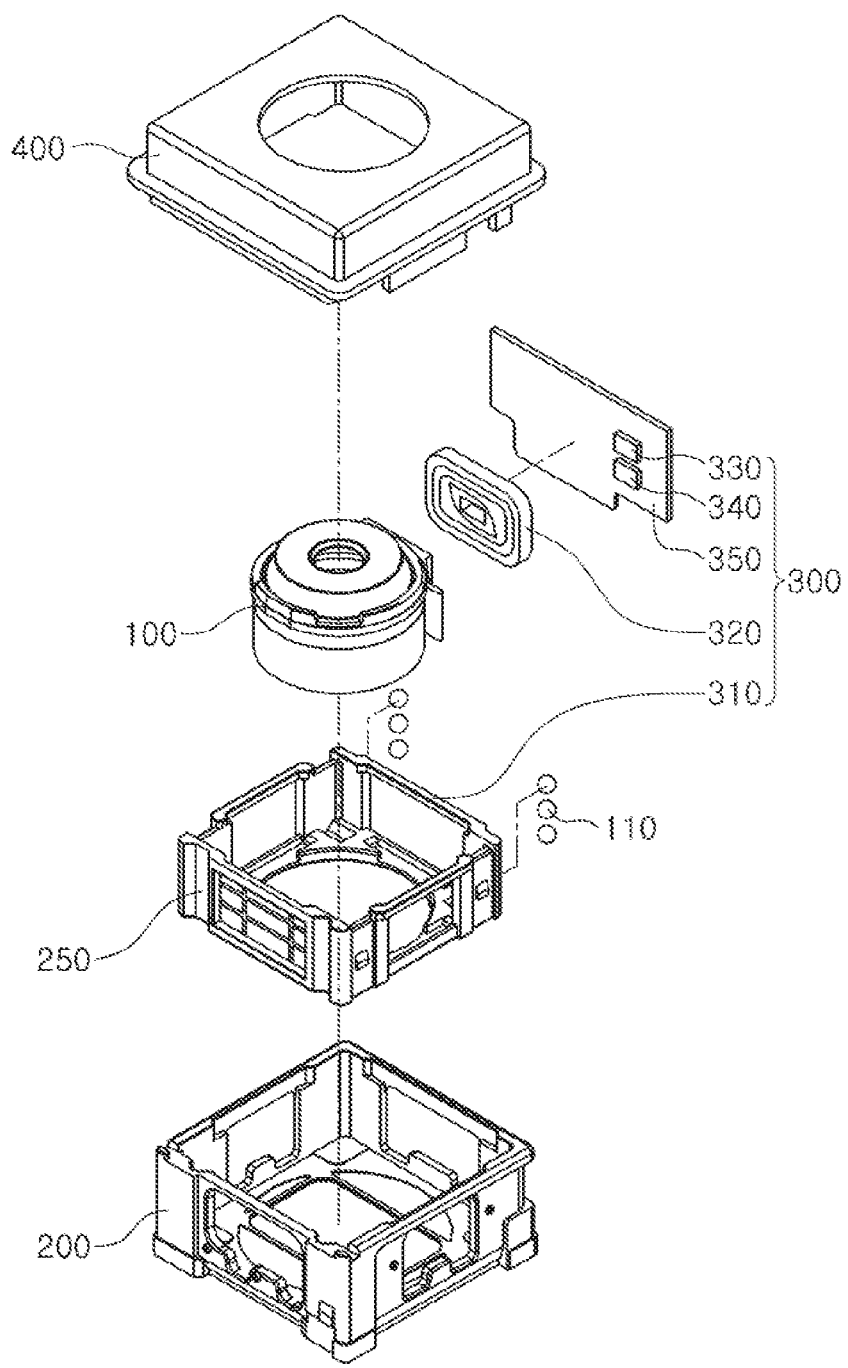
FIG. 2 is an exploded perspective view of a camera module, according to another embodiment.

FIG. 2 is an exploded perspective view of a camera module, according to another embodiment.

Referring to FIG. 2, the camera module, according to another embodiment, includes a lens barrel 100, a housing 200, a holder 250, an actuator 300, and a case 400.

Because the camera module illustrated in FIG. 2, is similar to the camera module illustrated and described with respect to FIG. 1, thus, for ease of understanding and conciseness, a description of contents that are the same as or overlap with previously described contents will be omitted, and contents that are different from previously described contents will mainly be described.

When comparing the camera module of FIG. 1 and the camera module of FIG. 2, the camera module of FIG. 2 further includes the holder 250 accommodating the lens barrel 100 therein.

The holder 250 receives and accommodates the lens barrel 100 therein and moves in the optical axis direction within the housing 200. A magnet 310 is disposed on one surface of the holder 250 in order to move the holder 250 accommodating the lens barrel 100 therein in the optical axis direction.

At least one ball bearing 110 may be provided in the optical axis direction on one surface of the holder 250 in order to guide and support movement of the holder 250 when the holder 250 moves in the optical axis direction within the housing 200. In an alternative configuration, the at least one ball bearing 110 is disposed on one internal corner or side of the housing 200 and sliding within a guiding portion of the housing 200. The at least one ball bearing 110 would support the movement of the holder 250 when the holder 250 moves in the optical axis direction within the housing 200.

The camera module of FIG. 2 is similar to the camera module of FIG. 1, except that the holder 250 accommodating the lens barrel 100 therein moves in the optical axis direction, and the camera module of FIG. 1 will thus be mainly described below. However, a description provided below may also be applied to the camera module of FIG. 2.

Again referring to FIG. 1, the actuator 300 is driven so that the lens barrel 100 may move in or along the optical axis direction. The actuator 300 includes a magnet 310, a coil 320, a driver 330, and a detector 340, and may further include a substrate 350. In one configuration, the substrate 350 is a flexible printed circuit board. The magnet 310 is disposed on one side surface of the lens barrel 100, and the coil 320 is disposed on one surface of the substrate 350 mounted in the housing 200, and face the magnet 310. Although not illustrated in FIG. 1, the actuator 300 may further include a yoke mounted on the other surface of the substrate 350 to prevent leakage of a magnetic flux generated between the magnet 310 and the coil 320, and the magnet 310 may include two magnetic bodies polarized from each other in order to easily move the lens barrel 100. In one embodiment, the magnetic bodies may be positioned side by side along the optical axis or, in another embodiment, the magnetic bodies may be positioned one on top of another perpendicular to the optical axis.

The driver 330 applies a driving signal to the coil 320 to provide driving force to the magnet 310, and the lens barrel 100 moves in the optical axis direction by the driving force of the magnet 310. In a case in which the driving signal is provided from the driver 330 to the coil 320, a magnetic flux may be generated in the coil 320, and may interact with a magnetic field of the magnet 310 so that the magnet 310 generates the driving force.

The driver 330 may include an H-bridge circuit that may be bi-directionally driven to apply the driving signal to the coil 320 in a voice coil motor scheme.

As the driver 330 applies the driving signal to the coil 320 to provide the driving force to the magnet 310 and drive the lens barrel 100, the detector 340 detects or estimates a position of the magnet 310 moving by the driving of the driver 330. The detector 340 provides the detected position of the magnet 310 as a feedback signal to the driver 330, and the driver 330 minutely or precisely adjusts the position of the magnet 310, using the feedback signal provided from the detector 340.

The detector 340, according to an embodiment, includes a resonant frequency detecting circuit formed within a magnetic field range of the magnet 310, and detects how a resonant frequency of the resonant frequency detecting circuit has changed, depending on movement of the magnet 310, to detect the current position of the magnet 310.

The driver 330 and the detector 340 may be mounted on the substrate 350 so as to face the magnet 310, and the substrate 350 may be fixed to or movably positioned with the housing 200.

An example in which the driver 330 and the detector 340 are disposed outside the coil 320 is illustrated in FIG. 1, but the driver 330 and the detector 340 may also be disposed in a hollow area provided inside the coil 320. In addition, an example in which the driver 330 and the detector 340 are mounted on one substrate 350 is illustrated in FIG. 1, but the driver 330 and the detector 340 may be separately formed on two different substrates, and the two different substrates may be disposed on opposite surfaces of the lens barrel 100, respectively. In an alternative embodiment, the two different substrates may be disposed operatively connected to each other.

Figure 3:
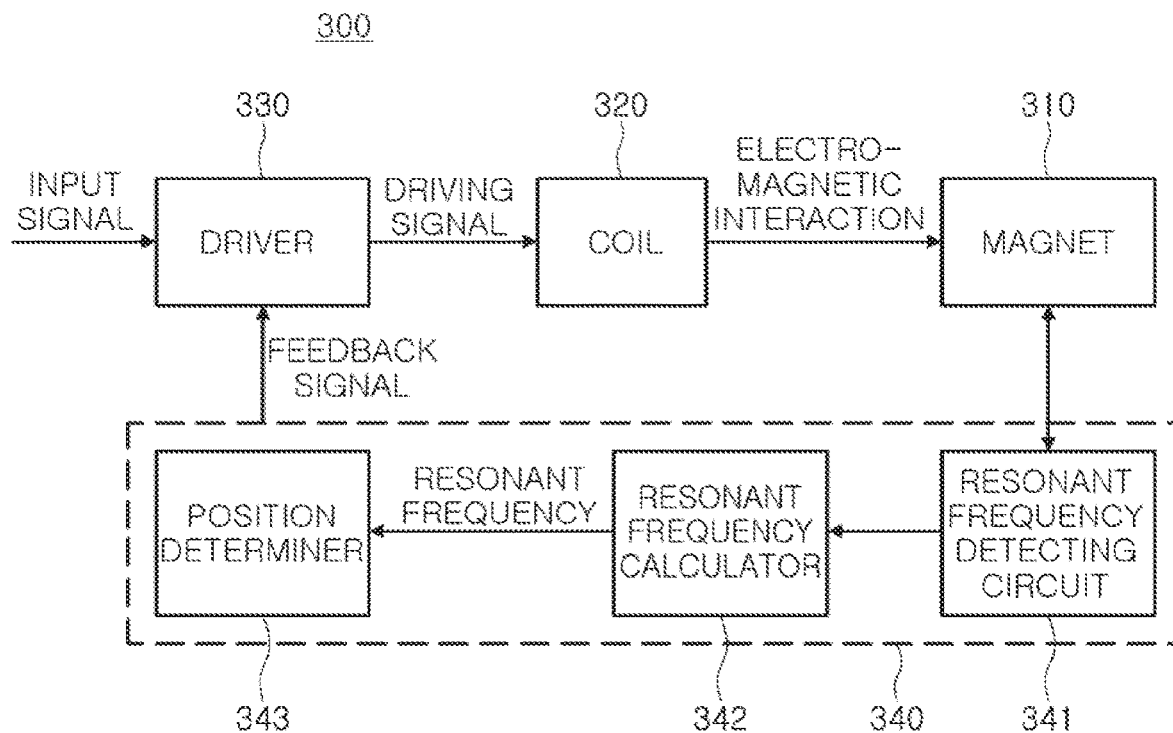
FIG. 3 is a block diagram illustrating an actuator used in a camera module, according to an embodiment.

FIG. 3 is a block diagram illustrating an actuator used in a camera module, according to an embodiment. Hereinafter, a driving scheme of the actuator, according to an embodiment, will be described in detail with reference to FIGS. 1 through 3.

The driver 330 receives an input signal applied from an external source and a feedback signal generated from the detector 340, and provides the driving signal to the coil 320.

The driver 330 provides a driving force to the magnet 310 according to an initial operation mode, an auto-focusing mode, and a maintaining mode. In an embodiment, the initial operation mode corresponds to a mode to maintain an initial position of the lens barrel 100, the auto-focusing mode corresponds to a mode to move the lens barrel 100 from the initial position to a target position, and the maintaining mode corresponds to a mode to maintain the target position.

The driver 330 provides the driving force to the magnet 310 based on the input signal applied from the external source and the feedback signal in the initial operation mode, the auto-focusing mode, and the maintaining mode.

In an example in which the driving signal generated from the driver 330 is applied to the coil 320, the driving force is provided to the magnet 310 through an electromagnetic interaction between the coil 320 and the magnet 310, and the lens barrel 100 moves in the optical axis direction through the support and the guidance of the at least one ball bearing 110.

The detector 340 includes a resonant frequency detecting circuit 341, a resonant frequency calculator 342, and a position determiner 343. The detector 340 detects a position of the magnet 310 to produce the feedback signal and enable the driver 330 to produce the driving signal based on the feedback signal.

In one embodiment, the resonant frequency detecting circuit 341 includes at least one capacitor, forming a resonant tank together with the coil 320 and a detection signal generator, which apply a detection signal to the resonant tank.

Figure 4:
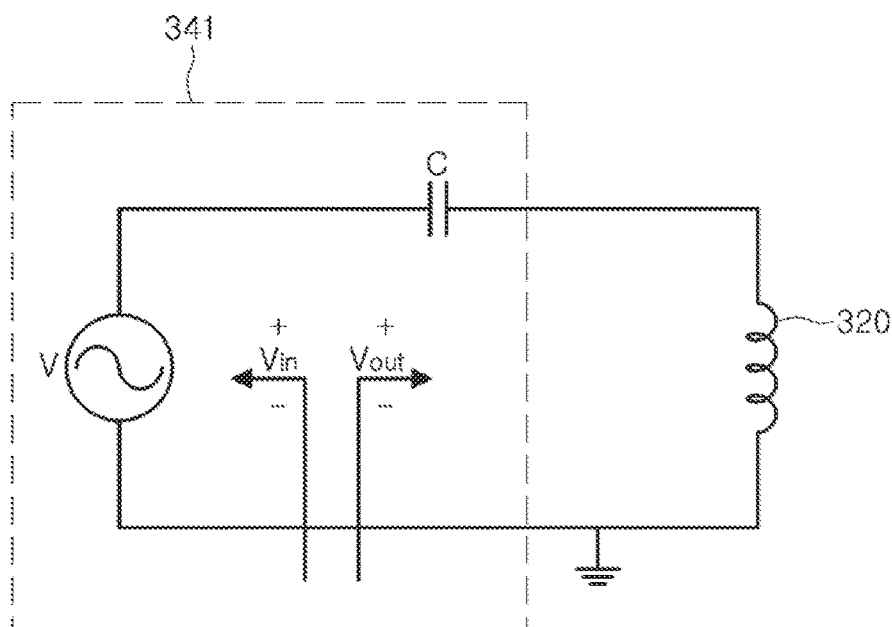
FIG. 4 is a circuit diagram of a resonant-frequency detecting circuit, according to an embodiment.

FIG. 4 is a circuit diagram of a resonant frequency detecting circuit, according to an embodiment.

Referring to FIG. 4, the resonant frequency detecting circuit 341 includes a detection signal generator V or a voltage generator V and at least one capacitor C. The detection signal generator V and the capacitor C of the resonant frequency detecting circuit 341 are electrically connected to each other through the coil 320 and a circuit pattern formed on the substrate 350.

The detection signal generator V generates a detection signal and provides the detection signal to the resonant tank including the coil 320 and the capacitor C. The detection signal is a signal with information used to detect a resonant frequency of the resonant tank. As an example, the detection signal is a sinusoidal wave of which a frequency is varied in a predetermined range.

Because the capacitor C and the coil 320, which are electrically connected to each other, form the resonant tank, in an example in which the detection signal is applied to the resonant tank, the resonant tank resonates at a resonant frequency f determined by Equation 1. In Equation 1, I indicates inductance of the coil 320, and c indicates capacitance of the capacitor C.

$$f = \frac{1}{2\pi\sqrt{lc}} \quad \text{[Equation 1]}$$

In an example in which the magnet 310 moves by the driving force from the driver 330, because the strength of a magnetic field of the magnet 310 changes, such magnitude change influences the inductance of the coil 320. Therefore, a resonant point of the resonant tank is varied, such that the resonant frequency f of the resonant tank changes depending on the movement of the magnet 310.

According to an embodiment, a magnetic body formed of a magnetic material having a high magnetic permeability and having a high magnetic permeability is formed between the magnet 310 and the resonant frequency detecting circuit 341 to enhance an influence of the inductance of the coil 320, and changes depending on the position of the magnet 310.

The resonant tank has been configured using one coil 320 and the capacitor C in FIG. 4, but the embodiment is not limited thereto. For example, the resonant frequency detecting circuit 341 may include at least one inductor element, at least one capacitor element, and at least one resistor element, and may form the resonant tank, together with the coil 320.

Referring to FIGS. 3 and 4, the resonant frequency calculator 342 calculates the resonant frequency, using a gain value corresponding to a ratio of an output voltage $V_{out}$ of the resonant tank to a voltage $V_{in}$ of the detection signal generated in the resonant frequency detecting circuit 341. As an example, the resonant frequency calculator 342 calculates a frequency at which the gain value is maximal as the resonant frequency.

Although a voltage across the capacitor C and the coil 320 is set to the output voltage in FIG. 4, the resonant tank is formed using at least one inductor element, at least one capacitor element, and at least one resistor element, as described above, and thus, a point at which the output voltage is measured may be changed.

Figure 5:
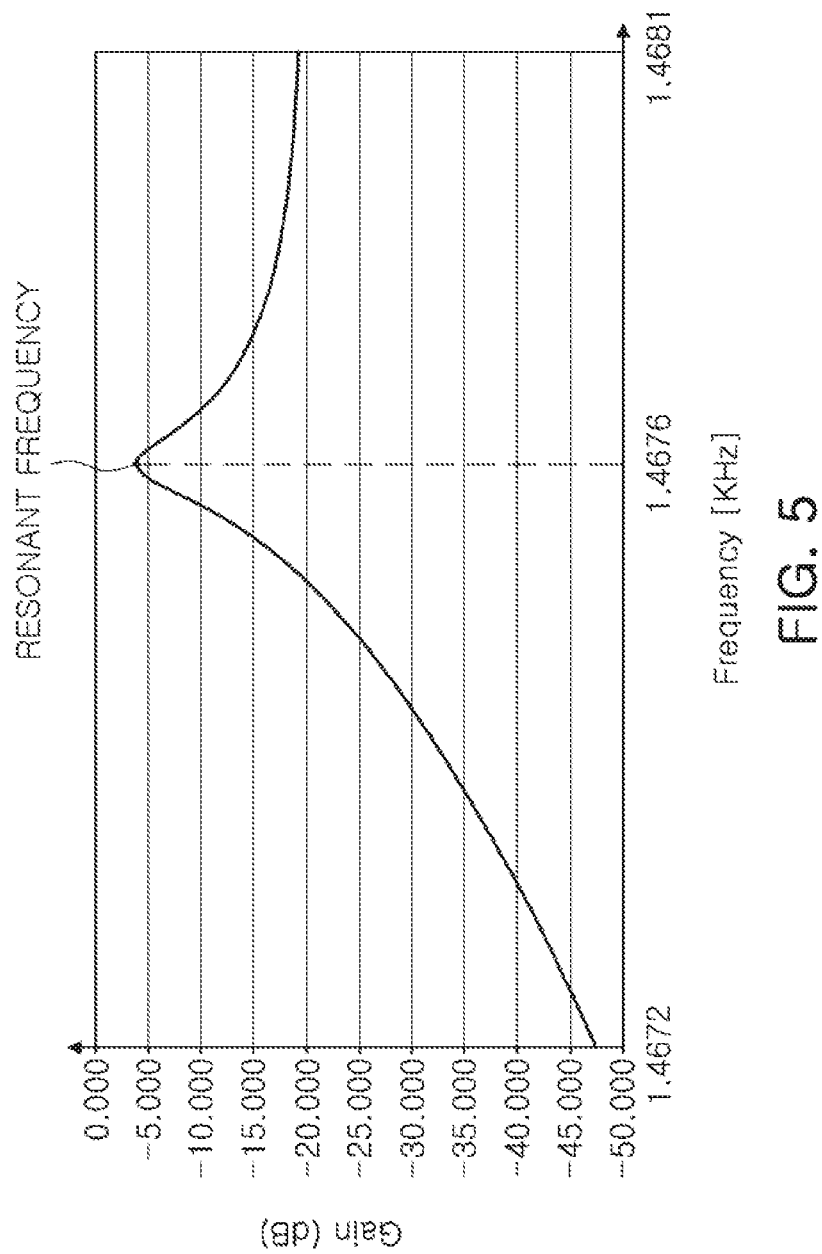
FIG. 5 is a graph illustrating calculation simulation data of a resonant frequency, according to an embodiment.

FIG. 5 is a graph illustrating calculation simulation data of a resonant frequency, according to an embodiment. When the detection signal generator V of FIG. 4 generates a sinusoidal wave of which a frequency is varied in a range of 1.4672 [KHz] to 1.4681 [KHz], a frequency has a maximum gain corresponding to about −5 [dB] at about 1.4676 [kHz]. As a result, the resonant frequency calculator 342 calculates 1.4676 [kHz] as the resonant frequency.

The position determiner 343 receives the resonant frequency transferred from the resonant frequency calculator 342, and determines the position of the magnet 310 depending on the resonant frequency. The position determiner 343 may include a memory, and position information of the magnet 310 corresponding to the resonant frequency may be stored in the memory.

In an example in which the resonant frequency is transferred from the resonant frequency calculator 342 to the position determiner 343, the position determiner 343 determines the position of the magnet 310 based on the position information of the magnet 310 stored in the memory.

The memory may be implemented by a non-volatile memory, including one of a flash memory, an electrically erasable programmable read-only memory (EEPROM), and a ferroelectric random access memory (FeRAM). The memory may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent after an understanding of the disclosure of this application that the computing system or computer may further include an application chipset, a camera image processor, a mobile Dynamic Random Access Memory (DRAM), or any other component suitable for inclusion in a computing system or computer. The memory controller and the flash memory device may constitute a solid-state drive or disk (SSD) that uses non-volatile memory to store data.

Figure 6:
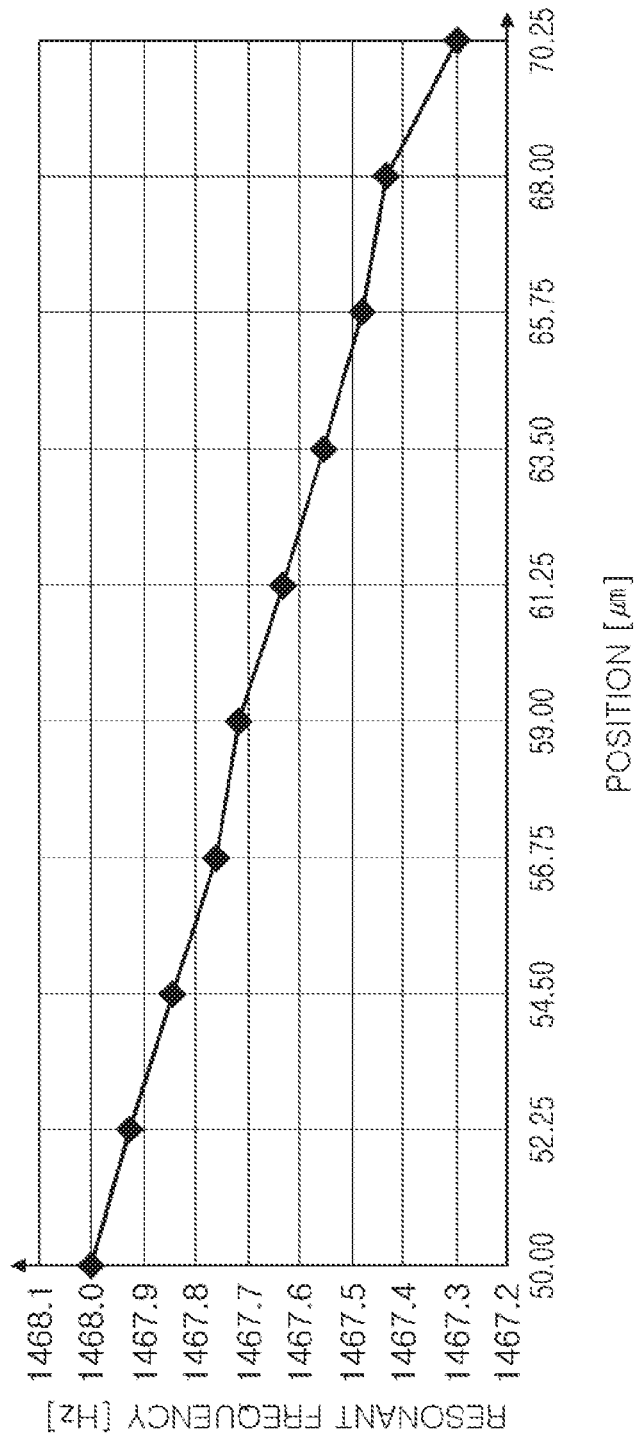
FIG. 6 is a graph illustrating data of position information of a magnet corresponding to a resonant frequency, according to an embodiment.

FIG. 6 is a graph illustrating data on position information of a magnet corresponding to a resonant frequency, according to an embodiment.

Referring to FIG. 6, a position of the magnet corresponding to about 1.4676 [kHz], corresponding to the resonant frequency determined in FIG. 5, is 59.00 [μm]. As a result, the position determiner 343 determines that the position of the magnet is 59.00 [μm].

The camera module and the actuator of the camera module, according to an embodiment, detect the position of the magnet using the resonant tank without using a separate hall sensor, thus, reducing a manufacturing cost of the camera module and the actuator of the camera module. Also, the exclusion of implementing a separate hall sensor improve space efficiency of the camera module and the actuator of the camera module.

As set forth above, the camera module actuator, according to an embodiment, precisely detects the position of the magnet from a change in the resonant frequency.

In addition, the camera module actuator does not use a separate hall sensor, such that a manufacturing cost of the camera module and the camera module actuator is reduced, and space efficiency of the camera module and the camera module actuator is improved.

The driving processor 330, the detector 340, the position determiner 343, the resonant frequency calculator 342, and the resonant frequency detecting circuit 341 in FIG. 3 that perform the functions described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the functions described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application.

The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module actuator, comprising:
a magnet;
a coil disposed to face the magnet;
a driver configured to apply a driving signal to the coil to move the magnet; and
a detector configured to detect a position of the magnet from a change in inductance of the coil based on the movement of the magnet,
wherein the detector comprises a resonant frequency detecting circuit including a capacitor, which forms a resonant tank together with the coil.

2. The camera module actuator of claim 1, wherein the inductance of the coil varies based on a strength of a magnetic field of the magnet.

3. The camera module actuator of claim 1, wherein
a resonant frequency of the resonant tank is determined based on the inductance of the coil.

4. The camera module actuator of claim 3, wherein the resonant frequency detecting circuit further comprises a detection signal generator configured to apply a detection signal to the resonant tank.

5. The camera module actuator of claim 4, wherein the detection signal comprises a sinusoidal wave of which a frequency is varied in a predetermined range.

6. The camera module actuator of claim 4, wherein the detector further comprises a resonant frequency calculator configured to calculate the resonant frequency of the resonant tank.

7. The camera module actuator of claim 6, wherein the resonant frequency calculator is further configured to calculate the resonant frequency using a gain value corresponding to a ratio of an output voltage of the resonant tank to a voltage of the detection signal.

8. The camera module actuator of claim 7, wherein the resonant frequency calculator is further configured to determine a frequency at which the gain value is maximal as the resonant frequency.

9. The camera module actuator of claim 4, wherein the detector further comprises a position determiner configured to determine the position of the magnet based on the resonant frequency.

10. The camera module actuator of claim 9, wherein the position determiner comprises position information of the magnet corresponding to the resonant frequency.

11. The camera module actuator of claim 1, wherein a magnetic body is disposed between the magnet and the detector.

12. A camera module actuator, comprising:
a magnet;
a coil disposed to face the magnet;
a driver configured to apply a driving signal to the coil to move the magnet in one direction; and
a detector comprising a capacitor forming a resonant tank with the coil and configured to detect a position of the magnet from a change in a resonant point of the resonant tank based on the movement of the magnet.

13. The camera module actuator of claim 12, wherein the detector is further configured to detect the position of the magnet from a resonant frequency in the resonant point.

14. The camera module actuator of claim 13, wherein the resonant frequency varies depending on a change of coil inductance, depending on a strength of a magnetic field of the magnet.

15. The camera module actuator of claim 13, wherein the detector is further configured to apply a detection signal to the resonant tank, wherein the detection signal comprises a sinusoidal wave of which a frequency varies within a predetermined range.

16. The camera module actuator of claim 15, wherein the detector is further configured to calculate the resonant frequency using a gain value corresponding to a ratio of an output voltage of the resonant tank to a voltage of the detection signal.

17. A camera module actuator, comprising:
a magnet;
a coil disposed opposite to the magnet to drive a lens barrel;
a detector comprising a capacitor forming a resonant tank with the coil, and configured to calculate a resonant frequency using a gain value corresponding to a ratio of an output voltage of the resonant tank to an input voltage of a detection signal; and
a driver configured to provide a driving force to the magnet based on a received input signal and a feedback signal.

18. The camera module actuator of claim 17, wherein the detector calculates a frequency at which the gain value is maximal as the resonant frequency.

19. The camera module actuator of claim 17, wherein the detection signal comprises a sinusoidal wave of which a frequency is varied at a predetermined range.

20. The camera module actuator of claim 17, wherein the resonant frequency varies based on a change of coil inductance, based on a strength of a magnetic field of the magnet.

21. The camera module actuator of claim 17, wherein to calculate the resonant frequency, the driver generates a reference clock signal within a duty cycle of the resonant tank.

22. The camera module actuator of claim 21, wherein a pulse count value of the reference clock changes according to a movement of the lens barrel.

23. The camera module actuator of claim 17, wherein the coil is located within a range of a magnetic field of the magnet and a conductor and a magnetic material are provided around a lens within the lens barrel.

24. A camera module, comprising:
a lens barrel;
a housing configured to accommodate the lens barrel; and
an actuator configured to move the lens barrel in an optical axis direction, wherein the actuator comprises
a magnet,
a coil, a driver configured to apply a driving signal to the coil to produce a driving force to the magnet and drive the lens barrel, and a detector comprising a resonant frequency detecting circuit configured to generate and provide a detection signal to a resonant tank comprising the coil electrically connected to a capacitor, a resonant frequency calculator configured to calculate a resonant frequency using a gain value corresponding to a ratio of an output voltage of the resonant tank to a voltage of the detection signal, and a position determiner configured to determine a position of the magnet based on the resonant frequency to produce a feedback signal and the driver produces the driving signal based on the feedback signal.

25. The camera module of claim 24, wherein a magnetic body is disposed between the magnet and the resonant frequency detecting circuit and is formed of a magnetic material having a high magnetic permeability to enhance an influence of the inductance of the coil and changes depending on the position of the magnet.

26. The camera module of claim 24, wherein the driver and the detector are disposed outside of the coil or in a hollow portion of the coil, inside of the coil.

27. The camera module of claim 24, wherein the resonant frequency calculator determines a frequency at which the gain value is maximal as the resonant frequency.

28. The camera module of claim 24, wherein a magnetic body formed of a magnetic material having a high magnetic permeability is formed between the magnet and the resonant frequency detecting circuit.

29. The camera module of claim 24, wherein the capacitor is positioned inside the actuator or on a printed circuit board outside the actuator.

* * * * *